(12) United States Patent
Moens et al.

(10) Patent No.: US 7,951,427 B2
(45) Date of Patent: May 31, 2011

(54) THERMOSETTING POWDER COMPOSITIONS

(75) Inventors: Luc Moens, St. Genesius-Rode (BE); Nele Knoops, Herent (BE); Daniel Maetens, Brussels (BE)

(73) Assignee: Cytec Surface Specialties, S.A., Brussels (BG)

( * ) Notice: Subject to any disclaimer, the term of this patent is extended or adjusted under 35 U.S.C. 154(b) by 520 days.

(21) Appl. No.: 11/920,347

(22) PCT Filed: May 15, 2006

(86) PCT No.: PCT/EP2006/004556
§ 371 (c)(1),
(2), (4) Date: Nov. 19, 2007

(87) PCT Pub. No.: WO2006/125545
PCT Pub. Date: Nov. 30, 2006

(65) Prior Publication Data
US 2008/0220178 A1    Sep. 11, 2008

(30) Foreign Application Priority Data
May 26, 2005  (EP) .................................. 05011415

(51) Int. Cl.
*B05D 1/22*    (2006.01)
(52) U.S. Cl. ........ 427/461; 427/185; 427/379; 427/384; 427/385.5; 427/427.4; 428/480; 525/437; 525/444; 525/934

(58) Field of Classification Search .................. 525/444, 525/934, 437; 427/185, 379, 384, 385.5, 427/427.4, 461; 428/480
See application file for complete search history.

(56) References Cited

U.S. PATENT DOCUMENTS

| | | | |
|---|---|---|---|
| 6,184,311 B1 * | 2/2001 | O'Keeffe et al. | 525/438 |
| 6,413,648 B1 * | 7/2002 | Heyenk et al. | 428/482 |
| 6,555,226 B1 * | 4/2003 | Kulzick et al. | 428/413 |
| 6,790,876 B2 * | 9/2004 | Moens et al. | 522/109 |
| 2003/0153640 A1 | 8/2003 | Moens et al. | |

FOREIGN PATENT DOCUMENTS

| | | |
|---|---|---|
| EP | 1 553 148 | 7/2005 |
| GB | 2 244 060 | 11/1991 |
| WO | WO 98/05320 * | 6/1989 |

* cited by examiner

*Primary Examiner* — David Wu
*Assistant Examiner* — Robert Jones
(74) *Attorney, Agent, or Firm* — Wenderoth, Lind & Ponack, LLP.

(57) ABSTRACT

The invention relates to thermosetting powder compositions which give coatings proving remarkable weatherability, excellent mechanical properties and an outstanding flow containing a binder which comprises a mixture of amorphous polyesters (A) containing from 50 to 100 mol % of isophthalic acid and from 70 to 100 mol % of neopentyl glycol, and (B) which comprises from 75 to 100 mol % of at least one straight-chain saturated di-carboxylic aliphatic acid having from 4 to 14 carbon atoms and from 75 to 100 mol % of at least one branched chain aliphatic diol.

16 Claims, No Drawings

THERMOSETTING POWDER COMPOSITIONS

The present invention relates to thermosetting powder compositions containing a binder which comprises a mixture of amorphous polyesters which give coatings proving remarkable weatherability, excellent mechanical properties and an outstanding flow. The invention also relates to the use of said compositions for the preparation of powdered paints and varnishes.

Carboxyl functional and hydroxyl functional polyesters suitable for use in the preparation of powdered varnishes and paints are usually prepared from aromatic polycarboxylic acids, mainly terephthalic acid and isophthalic acid and optionally a minor proportion of aliphatic or cycloaliphatic polycarboxylic acids, and from various polyols such as ethylene glycol, neopentyl glycol, 1,6-hexanediol, trimethylolpropane, and the like.

Some of these polyesters and the powders derived from them are used because of their remarkable weatherability characteristics. These polyesters mostly are derived from isophthalic acid, being the most important acid constituent among others. Yet, the coatings obtained from these polyesters, though proving outstanding weatherability, do not have any flexibility at all.

Some solutions have been sought for resolving the problems of lack of flexibility of coatings made from powders containing isophthalic-rich polyesters.

EP 649890 discloses powder coating compositions comprising a β-(HAA) crosslinking agent and an acid functional polyester having an acid number ranging from 15 through 70 mg KOH/g which is substantially based on dicarboxylic acid units containing 80 to 100% mole of isophthalic acid and on glycols containing at least 50% mole of branched aliphatic glycols with at least 4 carbon atoms and on monomers having a functionality of at least three, in an amount of up to 8% mole based on the total amount of dicarboxylic acids and glycols.

EP 389926 discloses flexible outdoor durable powder paints derived from isophthalic acid rich polyesters and 1,4-cyclohexanedicarboxylic acid which gives an unexpected influence on the impact resistance of the coatings derived from polyesters with a preponderant amount of isophthalic acid.

Though above-mentioned resin modifications result in powders which upon application and curing prove coatings with improved flexibility when slow deformations are considered, they more or less fail when fast deformations like direct or reverse impact are applied.

Besides, heat-curable powder compositions have been proposed in which the binder is composed of a co-reactable blend of an isophthalic acid rich polyester and a semi-crystalline polyester along with a curing agent having functional groups reactable with the polyesters' functional groups.

The use of semi-crystalline carboxylic acid- or hydroxyl-functional polyesters as co-reactable part of the carboxylic acid- or hydroxyl functional amorphous resin respectively, in a binder system along with a hardener being capable of reacting with the resins' functional groups, has been subject of several patents such as U.S. Pat. No. 4,859,760, WO 89/05320, WO 94/02552, WO 95/01407, WO 91/14745 and WO 97/20895.

Nevertheless, when isophthalic acid rich amorphous polyesters are involved, being especially designed for those applications, where an outstanding weatherability and flexibility is needed, the proper combination of the amorphous and the semi-crystalline polyester is very important, not only because of a possible deterioration of the original favorable properties, typical of the pure amorphous polyester based powder, but also because of potential drawbacks arising when powder processing or storage stability are considered. Indeed, blending of the amorphous and semi-crystalline polyester is very critical and can result in an "over-plasticized" system with a too low glass transition temperature. Grinding of the extrudate and storage of the thus obtained powder become problematical.

In conclusion it can be seen that the various powdered compositions which have been proposed today for outdoor applications, where outstanding weatherability and flexibility are required, all are characterized by some possible limitations or drawbacks, questioning their suitability.

There is thus still a need for powdered thermosetting compositions capable of producing coatings proving this unique combination of properties and not exhibiting the defects and/or shortcomings of prior art.

It has now been surprisingly found that by using a mixture of an isophthalic acid rich amorphous polyester (A) along with an amorphous polyester (B) rich of straight chain aliphatic diacids and branched chain aliphatic polyols, it is possible to obtain powdered thermosetting compositions which produce coatings proving an outstanding weatherability combined with an excellent flow and flexibility.

Moreover, it has been found that, contrary to prior art, these coatings' performances as well as the powder processing and storage are independent of the blending conditions of both polyesters (A) and (B).

The present invention therefore provides a binder composition containing-:
  from 99 to 55 parts by weight, calculated on the total weight of polyesters, of at least one amorphous polyester (A) which comprises, with respect to the total amount of acids, from 50 to 100 mol % of isophthalic acid and optionally from 0 to 50 mol % of at least one other aliphatic, cycloaliphatic and/or aromatic polycarboxylic acid and, with respect to the total amount of alcohols, from 70 to 100 mol % of neopentyl glycol and optionally from 0 to 30 mol % of at least one other aliphatic and/or cycloaliphatic polyol, said amorphous polyester (A) having a number average molecular weight of from 1100 to 11500, and
  from 1 to 45 parts by weight, calculated on the total weight of polyesters, of at least one amorphous polyester (B) which comprises, with respect to the total amount of acids, from 75 to 100 mol % of at least one straight-chain saturated di-carboxylic aliphatic acid having from 4 to 14 carbon atoms and optionally from 0 to 25 mol % of at least one other aliphatic, cycloaliphatic and/or aromatic polycarboxylic acid and, with respect to the total amount of alcohols, from 75 to 100 mol % of at least one branched chain aliphatic diol and optionally from 0 to 25 mol % of at least one other aliphatic or cycloaliphatic polyol, said amorphous polyester (B) having a number average molecular weight of from 1100 to 17000.

The amorphous polyesters (A) and (B) may be carboxyl functional polyesters or hydroxyl functional polyesters or mixtures of both. By carboxyl functional polyester is meant to designate in the present invention a polyester having free, generally terminal, carboxyl groups having an acid number of 10 to 100 mg of KOH/g. By hydroxyl functional polyester is meant to designate in the present invention a polyester having free, generally terminal, hydroxyl groups having an hydroxyl number of 10 to 100 mg of KOH/g.

According to a first and preferred embodiment of the invention, the composition comprises at least one carboxyl functional polyester (A) and at least one carboxyl functional polyester (B). In this embodiment, the carboxyl functional amorphous polyester (A) preferably has an acid number of 15 to 100 mg KOH/g, more preferably from 20 to 70 mg KOH/g. In this embodiment the carboxyl functional amorphous polyester (B) preferably has an acid number of from 15 to 80 mg KOH/g.

According to a second embodiment of the invention, the composition comprises at least one hydroxyl functional polyester (A) and at least one hydroxyl functional polyester (B). In this variant the hydroxyl functional polyester (A) preferably has an hydroxyl number of 15 to 100 mg KOH/g, more preferably of from 20 to 70 mg KOH/g. In this embodiment, the hydroxyl functional amorphous polyester (B) preferably has an hydroxyl number of from 15 to 80 mg KOH/g.

According to a third embodiment of the invention, the composition comprises a mixture of at least one carboxyl functional polyester ((A) or (B)) and at least one hydroxyl functional polyester ((B) or (A)) such as defined here above.

By amorphous polyester is meant to designate in the present invention a polyester which shows no or trace crystallization and which does not present a melting point as measured by Differential Scanning Calorimetry according to ASTM D3418 with a heating gradient of 20° C. per minute.

The binder composition according to the invention preferably contains, besides polyesters (A) and (B), not more than 5 parts, more preferably not more than 3 parts, by weight of a polyester different from polyesters (A) and (B). Most preferably, the binder does not contain other polyesters than polyesters (A) and (B). The binder composition preferably comprises 75 to 97, more preferably 80 to 95, parts by weight of one or more polyesters (A) and 3 to 25, more preferably 5 to 20, parts by weight of one or more polyesters (B), with respect to the total weight of the polyesters present in the binder.

The polyester blend can be obtained by blending the amorphous polyesters (A) and (B) in any known way. The polyester blend is preferably obtained by blending in the melt using the conventional cylindrical double-walled reactor.

The polyester (A) used in the composition according to the invention can, besides isophthalic acid, comprise from 0 to 50 mol % of at least one other aliphatic, cycloaliphatic and/or aromatic polycarboxylic acid. These other polycarboxylic acids are generally chosen from di-carboxylic acids or the anhydrides thereof, preferably selected from fumaric acid, maleic acid, o-phthalic acid, terephthalic acid, 1,4-cyclohexanedicarboxylic acid, 1,3-cyclohexanedicarboxylic acid, 1,2-cyclohexanedicarboxylic acid, succinic acid, adipic acid, glutaric acid, pimelic acid, suberic acid, azelaic acid, sebacic acid, dodecanedioic acid, undecanedioic acid, tridecanedioic acid, tetradecanedioic acid and their corresponding anhydrides, and mixtures thereof. However, the polyester (A) can also be a branched polyester incorporating up to 15 mole %, relative to the total amount of acids, of a polyacid having at least three carboxylic acid groups or anhydrides thereof, such as trimellitic acid, pyromellitic acid and their anhydrides, or mixtures thereof.

The polyester (A) used in the composition according to the invention more preferably comprises from 85 to 100 mole %, most preferably from 95 to 100 mole %, of isophthalic acid.

The polyester (A) can, besides neopentyl glycol, contain one or more other aliphatic or cycloaliphatic polyol. In general, these polyols are diols, such as ethylene glycol, diethylene glycol, propylene glycol, 1,3-propanediol, 1,4-butanediol, 1,5-pentanediol, 1,6-hexanediol, 1,4-cyclohexanediol, 1,3-cyclohexanedimethanol, 1,4-cyclohexanedimethanol, 2-methyl-1,3-propanediol, 2-ethyl-2-butyl-1,3-propanediol, hydrogenated Bisphenol A, hydroxypivalate of neopentyl glycol, 1,7-heptanediol, 1,8-octanediol, 1,9-nonanediol, 1,10-decanediol, 1,14-tetradecanediol, 1,16-hexadecanediol, and mixtures thereof. However, the polyester (A) can also be a branched polyester incorporating of up to 15 mol percentage relative to the total amount of alcohol, of a trifunctional or tetrafunctional polyol such as trimethylolpropane, ditrimethylolpropane, trimethylolethane, pentaerythrytol, alone or as a mixture.

The polyester (A) used in the composition according to the invention more preferably comprises from 85 to 100 mole % of neopentyl glycol and from 0 to 15 mole % of tri- and/or tetrafunctional polyol.

The amorphous polyester (A) used in the invention preferably has:
- a number averaged molecular weight of from 1600 to 8500, measured by gel permeation chromatography (GPC), and/or
- a glass transition temperature (Tg) of from 40 to 80° C., measured by Differential Scanning Calorimetry according to ASTM D3418 with a heating gradient of 20° C. per minute, and/or
- a Brookfield (cone/plate) viscosity accordingly to ASTM D4287-88, measured at 200° C., of from 5 to 15000 mPa·s.

The straight chain saturated aliphatic diacid having from 4 to 14 carbon atoms comprised in the amorphous polyester (B) used in the present invention is preferably selected from succinic acid, adipic acid, glutaric acid, pimelic acid, suberic acid, azelaic acid, sebacic acid, dodecanedioic acid, undecanedioic acid, tridecanedioic acid, tetradecanedioic acid and the anhydrides thereof, alone or as a mixture. The straight chain saturated aliphatic diacid comprised in the amorphous polyester (B) is most preferably adipic acid.

The other polycarboxylic acid optionally comprised in the amorphous polyester (B) is generally chosen from di-carboxylic acids or the anhydrides thereof, more specifically from fumaric acid, maleic acid, phthalic anhydride, isophthalic acid, terephthalic acid, 1,4-cyclohexanedicarboxylic acid, 1,3-cyclohexanedicarboxylic acid, 1,2-cyclohexanedicarboxylic acid, alone or as a mixture. However, the polyester (B) can also be a branched polyester incorporating up to 15 mole %, relative to the total amount of acids, of a polyacid having at least three carboxylic acid groups or anhydrides thereof, such as trimellitic acid, pyrromellitic acid and their anhydrides, or mixtures thereof.

The polyester (B) used in the composition according to the invention more preferably comprises from 85 to 100 mole %, most preferably from 95 to 100 mole %, of straight chain saturated di-carboxylic aliphatic acid having from 4 to 14 carbon atoms.

The branched chain aliphatic diol in the amorphous polyester (B) used in the invention is preferably selected from propylene glycol, neopentyl glycol, 2-methyl-1,3-propanediol, 2-butyl-2-ethyl-1,3-propanediol, hydroxypivalate of neopentyl glycol and mixtures thereof. The branched chain aliphatic polyol in the amorphous polyester (B) is most preferably neopentyl glycol.

The other aliphatic or cycloaliphatic polyol optionally comprised in the amorphous polyester (B) is generally a diol, and is preferably selected from ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,14-tetradecanediol, 1,16-hexadecanediol, 1,4-cyclohexanediol, 1,3-cyclohexanedimethanol, 1,4-cyclohexanedimethanol, hydrogenated Bisphenol A and mixtures thereof. However, the polyester (B) can also be a branched polyester incorporating of up to 15 mol percentage relative to the total amount of alcohol, of a trifunctional or tetrafunctional polyol such as trimethylolpropane, ditrimethylolpropane, trimethylolethane, pentaerythrytol and mixtures thereof.

The polyester (B) used in the composition according to the invention more preferably comprises from 85 to 100 mole % of branched chain aliphatic diol and from 0 to 15 mole % of tri- and/or tetrafunctional polyol.

The amorphous polyester (B) used in the invention preferably has:
- a number averaged molecular weight of from 1400 to 11500, measured by gel permeation chromatography (GPC), and/or
- a glass transition temperature (Tg) of from −100 to 25° C., more preferably of from −100 to 0° C., measured by Differential Scanning Calorimetry according to ASTM D3418 with a heating gradient of 20° C. per minute, and/or
- a Brookfield (cone/plate) viscosity accordingly to ASTM D4287-88, measured at 100° C. of from 5 to 20000 mPa·s.

The amorphous polyester (B) preferably is a liquid at 25° C.

The amorphous polyesters (A) and (B) according to the present invention can be prepared by any method, for example using conventional esterification techniques well known in the art. A standard esterification catalyst, such as dibutyltin oxide, dibutyltin dilaurate, n-butyltin trioctoate, titanates such as tetra-n-butyltitanate and titanium based chelates, sulphuric acid or a sulphonic acid, can be used in an amount from 0.05 to 1.50% by weight of the reactants and optionally, color stabilizers, for example, phenolic antioxidants such as IRGANOX™110 or phosphonite- and phosphite-type stabilizers such as tributylphosphite, can be added in an amount from 0 to 1% by weight of the reactants.

Polyesterification is generally carried out at a temperature which is gradually increased from 130° C. to about 190 to 250° C., first under normal pressure, then, when necessary, under reduced pressure at the end of each process step, while maintaining these operating conditions until a polyester, which has the desired hydroxyl and/or acid number, is obtained. The degree of esterification is followed by determining the amount of water formed in the course of the reaction and the properties of the obtained polyester, for example the hydroxyl number, the acid number, the molecular weight or the viscosity.

When polyesterification is complete, crosslinking catalysts can optionally be added to the polyester while it is still in the molten state. Examples of such catalysts, especially useful when carboxylated polyesters are used, include amines (e.g. 2-phenylimidazoline), phosphines (e.g. triphenylphosphine), ammonium salts (e.g. tetrabutylammonium bromide or tetrapropylammonium chloride), phosphonium salts (e.g. ethyltriphenylphosphonium bromide or tetrapropylphosphonium chloride). When hydroxyl functional polyesters are used, crosslinking catalysts such as organo-tin compounds, such as dibutyltin dilaurate, dibutyltin dimaleate, dibutyltin oxide, stannous octoate, 1,3-diacetoxy-1,1,3,3-tetrabutyldistanoxane, can be added to the polyester. These crosslinking catalysts are preferably used in an amount of from 0 to 5% with respect of the total weight of the polyesters (A) and (B).

The binder composition according to the present invention preferably further comprises at least one crosslinking agent having functional groups reactable with the functional groups of polyesters (A) and (B). When a carboxyl functional polyester is used in the composition, the crosslinking agent is generally a polyepoxy compound and/or a hydroxyalkylamide containing compound. In this case, the crosslinking agent is more preferably chosen from:
- polyepoxy compounds which are solid at room temperature and contain at least two epoxy groups per molecule such as, for example, triglycidyl isocyanurate, diglycidylterephthalate, triglycidyltrimellitate or mixtures thereof. Such polyepoxy compounds are for example commercialized under the name ARALDITE™PT810 or ARALDITE™PT910,
- acrylic copolymers containing glycidyl groups, especially those obtained from the polymerization of glycidyl methacrylate and/or glycidyl acrylate and a (meth) acrylic monomer and, optionally, an ethylenically mono-unsaturated monomer different from glycidyl (meth)acrylate and the (meth)acrylic monomer. An example of this type of acrylic copolymer is SYNTHACRYL™ 710 and GMA300 (marketed by Estron Chemical Inc), and is mentioned in WO 92/01748,
- β-hydroxyalkylamides which contain at least one, preferably two bis(β-hydroxyalkyl)amide groups, such as those mentioned in U.S. Pat. No. 4,727,111, U.S. Pat. No. 4,788,255, U.S. Pat. No. 4,076,917, EP-A-322834 and EP-A-473380, and
- mixtures thereof.

This crosslinking agent is preferably used in an amount of from 0.25 to 1.40, more preferably of from 0.60 to 1.05, equivalent of carboxyl group present in the amorphous polyesters (A) and (B) per equivalent of epoxy or/and β-hydroxyalkyl groups.

When a hydroxyl functional polyester is used in the composition, the crosslinking agent is generally a blocked isocyanate cross-linking agent, well known in the art. Examples of the blocked polyisocyanate cross-linking compounds include those which are based on isophorone diisocyanate blocked with ε-caprolactam, commercially available as HÜLS™B1530, RUCO™NI-2 and CARGILL™2400, or toluene-2,4-diisocyanate blocked with ε-caprolactam, commercially available as CARGILL™2450, and phenol-blocked hexamethylene diisocyanate. Another class of blocked polyisocyanate compounds which may be employed are adducts of the 1-diazetidine-2,4-dione dimer of isophorone diisocyanate and a diol, wherein the ratio of NCO to OH-groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70 to 130° C. Such an adduct is commercially available under the name HÜLS™BF1540.

The blocked isocyanate cross-linking agent described herein above is preferably used in an amount from 0.3 to 1.4, more preferably from 0.7 to 1.2, equivalent of hydroxyl group present in the amorphous polyesters per equivalent of isocyanate.

When a mixture of a carboxyl functional polyester and a hydroxyl functional polyester is used in the composition according to the invention, it is preferred to use two or more of the crosslinking agents as described here above.

The binder composition according to the invention generally contains from 45.5 to 99.5 parts of polyesters (A) and (B), from 0.5 to 54.5 parts by weight of crosslinking agent as defined above and optionally from 0 to 5 parts by weight of crosslinking catalyst.

The binder composition more preferably contains from 63 to 97 parts by weight of polyesters (A) and (B), from 3 to 37 parts by weight of crosslinking agent and from 0 to 3 parts by weight of crosslinking catalyst.

The present invention further relates to compositions comprising in addition to the components of the binder composition described above, one or more usual additives such as flow control agents (for example RESIFLOW™PV5, MODAFLOW™, ACRONAL™4F), degassing agents (such as benzoin), UV-light absorbers (such as TINUVIN™900), stabilizers (such as hindered amine light stabilizers like TINUVIN™144), stabilizers from the phosphonite or phosphite type and/or other stabilizers like TINUVIN™312 and 1130) and/or antioxidants (such as IRGANOX™1010). The total amount of these additives usually does not exceed 10%, preferably not 5%, by weight of the composition.

The compositions of the present invention can be used as clear lacquers or paints as such, or, if desired the compositions can be used in the preparation of clear powder lacquers or paints by adding further constituents conventionally used in the preparation of powder paints and lacquers. Both, pigmented systems as well as clear lacquers can be prepared. A variety of dyes and pigments can be utilized in the composition of this invention. Examples of useful pigments and dyes are metallic oxides such as titanium dioxide, iron oxide, zinc oxide and the like, metal hydroxides, metal powders, sulphides, sulphates, carbonates, silicates such as ammoniumsilicate, carbon black, talc, china clay, barytes, iron blues, lead blues, organic reds, organic maroons and the like.

The amount of dyes and pigments used in the compositions according to the invention does generally not exceed 60% by weight, preferably not 40% by weight.

According to a preferred embodiment, the composition of the present invention comprises from 35 to 95 weight % of amorphous polyester (A), from 1 to 25 wt % of amorphous polyester (B), from 2 to 30 wt % of crosslinking agent, from 0 to 5 wt % of crosslinking catalyst, from 0 to 5 wt % of usual additives and from 0 to 40 wt % of dyes and/or pigments.

The compositions of the invention are generally present under the form of a powder, such as thermosetting powder compositions. The components of the composition according to the invention may be mixed by dry blending in a mixer or blender (e.g. drum mixer). The premix is generally homogenized at temperatures ranging from 70 to 150° C. in a single screw extruder such as the BUSS-Ko-Kneter or a double screw extruder such as the PRISM or APV. The extrudate, when cooled down, is usually grounded to a powder with a particle size ranging from 10 to 150 μm.

The present invention further relates to a composition comprising a blend of at least one powder composition (i) comprising at least one polyester (A) and at least one polyester (B) as described here above and at least one powder composition (ii) comprising at least one amorphous polyester (A') different from the polyester (A) and which comprises, with respect to the total amount of acids, from 50 to 100 mol % of isophthalic acid and optionally from 0 to 50 mol % of at least one other aliphatic, cycloaliphatic and/or aromatic polycarboxylic acid and, with respect to the total amount of alcohols, from 70 to 100 mol % of neopentyl glycol and optionally from 0 to 30 mol % of at least one other aliphatic and/or cycloaliphatic polyol, said amorphous polyester (A') having a number average molecular weight of from 1100 to 11500. The powder composition (ii) preferably further comprises at least one amorphous polyester (B') which may be the same or different from the polyester (B) and which comprises, with respect to the total amount of acids, from 75 to 100 mol % of at least one straight-chain saturated di-carboxylic aliphatic acid having from 4 to 14 carbon atoms and optionally from 0 to 25 mol % of at least one other aliphatic, cycloaliphatic and/or aromatic polycarboxylic acid and, with respect to the total amount of alcohols, from 75 to 100 mol % of at least one branched chain aliphatic diol and optionally from 0 to 25 mol % of at least one other aliphatic or cycloaliphatic polyol, said amorphous polyester (B') having a number average molecular weight of from 1100 to 17000. The powder compositions (i) and (ii) generally comprise from 35 to 95 weight % of amorphous polyester (A), respectively (A'), from 1 to 25 wt % of amorphous polyester (B), respectively (B'), from 2 to 30 wt % of crosslinking agent, from 0 to 5 wt % of crosslinking catalyst, from 0 to 5 wt % of usual additives and from 0 to 40 wt % of dyes and/or pigments.

The powder composition can, in addition to powder compostions (i) and (ii), comprise one or more additional powder compositions according or not to the present invention. The powdered compositions may be deposed on a substrate by use of a powder gun such as an electrostatic CORONA gun or TRIBO gun. On the other hand well known methods of powder deposition such as the fluidized bed technique can also be used. After deposition the powder is usually heated to a temperature of from 100 and 300° C. during a time of from approximately 5 seconds to 60 minutes, causing the particles to flow and fuse together to form a smooth, uniform, continuous, uncratered coating on the substrate surface.

Another object of the present invention is therefore a process for coating an article, wherein a thermosetting powder composition according to the invention is applied to said article by spray deposition using an electrostatic or triboelectric gun or by fluidized-bed deposition, and wherein the coating thus obtained is subjected to a curing operation at a temperature of from 100 to 300° C. for a time of from 5 seconds to 60 minutes. Coatings can be applied to different substrates such as metal, paper, cardboard, wood, engineered wood, plywood, fiberboard, textile, plastic, etc. Good results have been obtained with metallic and wood articles.

The powder compositions according to the invention can be deposited at a layer thickness of from 80 to 250 μm by electrostatic deposition on medium density fibreboard (MDF) or other engineered wood, preferably placed into contact with a conductive support. Subsequently the powder is generally fused and cured at a temperature of 100 to 200° C. for a period from 10 seconds to 60 minutes by means of radiant heat, preferably from a short wavelength infrared (SIR) or medium wavelength infrared source (MIR) or a combination of both. Prior to the application of the powder composition, a primer can be applied to the substrate at a layer thickness of 50 to 150 μm which is then cured and sanded. This primer can be obtained from a composition as described here above or it can be a composition comprising other types of resins such as standard outdoor or hybrid resins.

The invention is also concerned by articles partially or entirely coated by the coating process.

The present invention is illustrated by the following, non-limiting examples.

Polyester PE 1: Synthesis of an Isophthalic Acid Rich Polyester (A)

A mixture of 423.82 parts of neopentyl glycol is placed in a conventional four neck round bottom flask equipped with a stirrer, a distillation column connected to a water cooled condenser, an inlet for nitrogen and a thermometer attached to a thermoregulator. The flask contents are heated, while stirring under nitrogen, to a temperature of circa 130° C. at which point 720.34 parts of isophthalic acid and 2.5 parts of n-butyltintrioctoate are added. The heating is continued gradually to a temperature of 230° C. Water is distilled from the reactor from 180° C. on. When distillation under atmospheric pressure stops, a vacuum of 50 mm Hg is gradually applied. After three hours at 230° C. and 50 mm Hg, following characteristics are obtained: AN=32 mg KOH/g; OHN=2 mg KOH/g; Brookfield viscosity 200° C. (cone/plate)=3000 mPa·s Tg (DSC, 20°/min)=57° C.

Polyester PE 2: Synthesis of a Branched Chain Aliphatic Amorphous Polyester (B)

According to the procedure described for PE 1, 455.98 parts of neopentyl glycol, 689.97 parts of adipic acid, 14.80 parts of trimethylolpropane, 1.99 parts of n-butyltintrioctoate and 1.00 parts on tributylphosphite are put into reaction until a polyester with following characteristics is obtained: AN=21 mg KOH/g; OHN=2 mgKOH/g; Tg (DSC, 20°/min)=−45° C.

Polyesters PE 3 to 9, 12 and 13: Synthesis of Amorphous Polyesters (A) and (B):

According to the procedure described here above for PE 1 and 2, the polyesters PE 3 to 9, 12 and 13, having the compositions as in table 1, were prepared.

The polyester blends thus obtained, were then mixed with the crosslinking agent and the crosslinking catalyst (ethyltriphenylphosphonium bromide) as specified in Table 2 (forming the binder) and formulated to a powder accordingly to one of the formulations as mentioned below.

| Formulation A | Formulation B |
| White paint formulation | Brown paint formulation |
| (quantities in parts by weight) | (quantities in parts by weight) |
|---|---|
| Binder: 69.06 | Binder: 78.33 |
| KRONOS 2610: 29.60 | BAYFERROX 130: 4.44 |
| RESIFLOW PV5: 0.99 | BAYFERROX 3950: 13.80 |
| Benzoin: 0.35 | Carbon Black FW2: 1.09 |
| | RESIFLOW PV5: 0.99 |
| | Benzoin: 0.35 |

TABLE 1

| | PE 3 | PE 4 | PE 5 | PE 6 | PE 7 | PE 8 | PE 9 | PE 12 | PE 13 |
|---|---|---|---|---|---|---|---|---|---|
| iPA | 728.21 | 724.74 | | | | | | 732.84 | 715.34 |
| AdA | | | 692.79 | 478.00 | | | 551.13 | | |
| DDA | | | | | 779.18 | | | | |
| Sebacic acid | | | | | | 755.27 | | | |
| NPG | 410.28 | 400.58 | 465.95 | | 333.85 | 370.41 | | 366.93 | 429.96 |
| HPN | | | | 630.98 | | | | | |
| BEPD | | | | | | | 575.88 | | |
| TMP | | 22.67 | | | | | | 39.72 | |
| Fascat 4102 | 2.49 | 2.49 | 2.49 | 2.49 | 2.49 | 2.49 | 2.49 | 2.49 | 2.49 |
| AN, mgKOH/g | 53 | 30 | 33 | 23 | 22 | 23 | 22 | 49 | 21 |
| OHN, mgKOH/g | 3 | 3 | 4 | 3 | 2 | 2 | 3 | 2 | 2 |
| Brookfield visc. 200° C. mPa·s | 2050 | 5400 | | | | | | 5700 | 3900 | iPA: isophthalic acid;
AdA: adipic acid;
DDA: dodecanedioic acid;
NPG: neopentyl glycol;
HPN: neopentyl glycol hydroxypivalate;
BEPD: 2-butyl-2-ethyl-1,3-propanediol;
TMP: trimethylolpropane;
FASCAT™ 4102: n-butyltintrioctoate catalyst PE 10: A mixture of 459.4 parts of 1,6-hexanediol is placed in a conventional four neck round bottom flask equipped with a stirrer, a distillation column connected to a water cooled condenser, an inlet for nitrogen and a thermometer attached to a thermoregulator. At a temperature of 150° C. 579.5 parts of terephthalic acid, and 2.5 parts of n-butyltintrioctoate are added. The reaction is continued at 235° C. under atmospheric pressure until about 95% of the theoretical amount of water is distilled and a transparent hydroxyl functionalized prepolymer with following characteristics is obtained: AN = 5 mg KOH/g; OHN = 53 mg KOH/g.
To the first step prepolymer standing at 200° C., 101.3 parts of adipic acid is added. Thereupon, the mixture is gradually heated to 235° C. After a 2 hour period at 235° C., 1.0 parts of tributyl phosphite is added and a vacuum of 50 mmHg is gradually applied. After 3 hours at 230° C. and 50 mmHg, following characteristics are obtained: AN = 32 mg KOH/g; OHN = 0.5 mg KOH/g; Brookfield viscosity 200° C. = 1500 mPa·s; Tg (DSC, 20°/min) = 28° C.; Tm (DSC; 20°/min) = 131° C.
PE 11: According to the procedure described for PE 1, 406.03 parts of neopentyl glycol, 652.27 parts of isophthalic acid, 69.00 parts of adipic acid, 21.52 parts of trimethylolpropane, 1.99 parts of n-butyltintrioctoate and 1.00 parts on tributylphosphite are put into reaction until a polyester with following characteristics is obtained: AN = 31 mg KOH/g; OHN = 2 mg KOH/g; Brookfield viscosity @200° C. = 6500 mPa·s; Tg (DSC, 20°/min) = 59° C.
Synthesis of a glycidyl group containing acrylic copolymer GA1: 388.48 weight parts of n-butylacetate are brought in a double walled reactor equipped with a stirrer, a water cooled condenser, an inlet for nitrogen and a thermocouple attached to a thermoregulator. The n-butylacetate is heated to a 92° C. under mild nitrogen overflow conditions. At a temperature of 92° C. a mixture of 12.29 parts VAZO 67 (2,2'-azobis(2-methylbutanenitrile)) solubilised in another 97.12 parts of n-butylacetate are fed to the flask during 215 minutes with a peristaltic pump. 5 minutes after this start, another pump is started with the feeding of a mixture consisting of 72.84 parts styrene, 135.97 parts glycidyl methacrylate, 150.98 parts isobornylacrylate, 125.82 parts of methyl methacrylate, 16.51 parts of n-dodecylmercaptan, during 180 minutes. The synthesis takes 315 minutes.
After the evaporation of the n-butyl acetate an acrylic copolymer with following characteristics is obtained: Mn (GPC; polyst. cal.): 5240; Mw (GPC; polyst. cal.): 9500; Disp.: 1.80; Epoxy equivalent weight (g/eq): 540; Tg (TMA): 71/86; Brookfield visc. in mPa·s at 175° C. (Cone 5) 200 RPM: 9500.
Preparation of the glycidyl group containing acrylic copolymer GA2: 80 parts of n-butylacetate are brought in a double walled flask of 5l equipped with a stirrer, a water cooled condenser, an inlet for nitrogen and a thermocouple attached to a thermoregulator. The flask content is then heated and stirred continuously while nitrogen is purged through the solvent. At a temperature of 125° C. a mixture of 3.0 parts of tert-butylperoxybenzoate in 20 parts of n-butyl acetate are fed in the flask during 215 minutes with a peristaltic pump. 5 minutes after this start another pump is started with the feeding of a mixture of 52 parts of styrene, 18 parts of parts of methyl methacrylate, during 180 minutes. The synthesis takes 315 minutes.
After evaporation of the n-butyl acetate an acrylic copolymer with following characteristics is obtained: Brookfield @200° C.: 15900 mPa·s; Mn: 6217; Mw: 15657; Epoxy Equivalent Weight: 800 g/equiv.; Tg (DSC, 20° C./min): 81° C. Examples 1 to 17 and 21 to 26 and Comparative examples 18 and 19: Blends of the amorphous polyesters (A) and (B): To the isophthalic acid rich polyesters PE1, PE3, PE4, PE12 and PE13 respectively 3 The synthesis takes 315 minutes. and still in the molten stage were added, under agitation and nitrogen atmosphere, using a conventional round bottom flask, well defined quantities, as specified in table 2, of the polyesters (B) PE2, PE5, PE6, PE7, PE8 and PE9.

The powders were prepared first by dry blending of the different components and then by homogenization in the melt using a PRISM 16 nm L/D 15/1 twin screw extruder at an extrusion temperature of 85° C. The homogenized mix was then cooled and grinded in an Alpine. Subsequently the powder was sieved to obtain a particle size between 10 and 110 μm. The powder thus obtained was deposited on cold rolled steel with a thickness of 0.8 mm, by electrostatic deposition using the GEMA—Volstatic PCG 1 spray gun. At a film thickness between 50 and 80 μm the panels were transferred to an air-ventilated oven, for curing for a certain period of time and at a certain temperature, both as indicated in table 3.

The paint characteristics for the finished coatings obtained from the combination of the different amorphous polyesters (A) and (B), as illustrated in this invention, are reproduced in the table 3. In the same table are reproduced, as comparative examples, the paint performances of the powders derived from a carboxyl functionalized amorphous isophthalic acid rich polyester, not containing the amorphous polyester (B) (comparative example 18 and comparative example 19).

In these tables:
Column I & VIII: indicate the identification number of the formulation
Column II: indicates the type of formulation A or B
Column III: indicates the type and quantity of carboxyl functional amorphous isophthalic acid rich polyester (A) present in the binder
Column IV: indicates the type and quantity of the amorphous aliphatic polyester (B) present in the binder (except for Comparative Examples 18 and 19)
Column V: indicates the type of the crosslinking agent (hardener) where:
PT810=ARALDITE™810=triglycidylisocyanurate
XL552=PRIMID™XL552=N,N,N',N'-tetrakis-(2-hydroxyethyl)-adipamide
Synthacryl=SYNTHACRYL™710=glycidyl group containing acrylic copolymer
GA 1 and GA2=glycidyl group containing acrylic copolymer as described here above
Column VI: indicates the weight percentage of the crosslinking agent in the binder
Column VII: indicates the weight percentage of crosslinking catalyst in the binder
Column IX: indicate the curing temperature (° C.)/curing time (min.)
Column X: indicates the 60° gloss, measured according to ASTM D523
Column XI: indicates the direct/reverse impact strength measured according to ASTM D2794. The highest impact which does not crack the coating is recorded in kg.cm.
Column XII: indicates the Erichsen slow embossing measured according to ISO 1520.

The highest penetration which does not crack the coating is recorded in mm.

TABLE 2

| I Powder | II Form. | III polyester (A) | IV polyester (B) | V Hardener | VI % | VII % catalyst |
|---|---|---|---|---|---|---|
| Example 1 | A | PE1 73.7 | PE2 18.4 | PT810 | 6.9 | 1.0 |
| Example 2 | A | PE1 61.8 | PE2 15.4 | GA 1 | 21.8 | 1.0 |
| Example 3 | A | PE4 85.5 | PE2 9.5 | XL552 | 5 | 0.0 |
| Example 4 | A | PE4 87.5 | PE2 4.6 | PT810 | 6.9 | 1.0 |
| Example 5 | A | PE3 71.6 | PE2 17.9 | PT810 | 10 | 0.5 |
| Example 6 | A | PE3 80.5 | PE2 9.0 | PT810 | 10 | 0.5 |
| Example 7 | A | PE3 74.4 | PE2 18.6 | XL552 | 7 | 0.0 |
| Example 8 | A | PE1 74.0 | PE5 18.5 | PT810 | 7 | 0.5 |
| Example 9 | A | PE1 76.0 | PE5 19.0 | XL552 | 5 | 0.0 |
| Example 10 | A | PE1 76.0 | PE6 19.0 | XL552 | 5 | 0.0 |
| Example 11 | A | PE1 76.0 | PE7 19.0 | XL552 | 5 | 0.0 |
| Example 12 | A | PE1 76.0 | PE8 19.0 | XL552 | 5 | 0.0 |
| Example 13 | A | PE1 76.0 | PE9 19.0 | XL552 | 5 | 0.0 |
| Example 14 | B | PE1 73.7 | PE2 18.4 | PT810 | 6.9 | 1.0 |
| Example 15 | B | PE1 61.8 | PE2 15.4 | GA 1 | 21.8 | 1.0 |
| Example 16 | A | PE1 68.8 | PE2 3.6 | GA 2 / XL552 | 25.3 / 2.1 | 0.2 |
| Example 17 | A | PE1 65.9 | PE2 3.5 | Synthacryl / XL5521 | 24.2 / 6.2 | 0.2 |
| Comp. Ex. 18 | B | PE1 73.7 | PE10 18.4 | PT 810 | 6.9 | 1.0 |
| Comp. Ex. 19 | A | PE11: 95 | | XL552 | 5 | 0.0 |
| Example 21 | A | PE12 85.5 | PE2 4.5 | PT810 | 10 | 0.0 |
| Example 22 | A | PE12 85.4 | PE2 4.5 | PT810 | 10 | 0.1 |
| Example 23 | A | PE12 86.5 | PE2 4.5 | XL552 | 9.0 | 0.0 |
| Example 24 | A | PE13 91.2 | PE2 4.8 | PT810 | 4.0 | 0.0 |
| Example 25 | A | PE13 91.0 | PE2 4.8 | PT810 | 4.0 | 0.2 |
| Example 26 | A | PE13 91.7 | PE2 4.8 | XL552 | 3.5 | 0.0 |

TABLE 3

| VIII Powder | IX Curing, ° C./minutes | X Gloss | XI DI/RI, kg · cm | XII Erichsen, mm |
|---|---|---|---|---|
| Example 1 | 200/18 | 92 | 200/120 | 8.9 |
| | 140/25 | 92 | 80/40 | 8.8 |
| Example 2 | 200/18 | 95 | 40/40 | 8.2 |
| | 140/25 | 95 | 40/40 | 8.8 |
| | 120/25 | 90 | 20/20 | 8.3 |
| Example 3 | 200/18 | 80 | 200/200 | 11.0 |
| | 160/25 | 83 | 180/180 | 8.8 |
| Example 4 | 200/18 | 78 | 200/200 | 9.4 |
| | 140/25 | 80 | 160/160 | 9.0 |
| | 120/25 | 77 | 100/80 | 8.7 |
| Example 5 | 200/18 | 94 | 160/160 | 7.9 |
| | 140/25 | 95 | 160/140 | 8.5 |
| Example 6 | 200/18 | 90 | 200/200 | 10.0 |
| | 140/25 | 92 | 120/80 | 11.2 |
| Example 7 | 200/18 | 89 | 200/200 | 9.9 |
| | 160/25 | 92 | 200/200 | 10.3 |

TABLE 3-continued

| VIII Powder | IX Curing, °C./minutes | X Gloss | XI DI/RI, kg · cm | XII Erichsen, mm |
|---|---|---|---|---|
| Example 8 | 200/18 | 91 | 200/200 | 10.5 |
|  | 140/25 | 89 | 200/200 | 10.2 |
| Example 9 | 200/18 | 89 | 200/200 | 11.6 |
|  | 160/25 | 90 | 200/200 | 10.2 |
| Example 10 | 200/18 | 84 | 120/140 | 9.9 |
|  | 160/25 | 89 | 100/100 | 10.9 |
| Example 11 | 200/18 | 91 | 200/200 | 8.9 |
|  | 160/25 | 85 | 160/140 | 8.0 |
| Example 12 | 180/20 | 89 | 200/200 | 8.4 |
|  | 160/25 | 84 | 200/200 | 7.6 |
| Example 13 | 180/20 | 91 | 200/200 | 8.5 |
|  | 160/25 | 89 | 200/200 | 7.9 |
| Example 14 | 200/18 | 90 | 100/80 | 8.2 |
| Example 15 | 200/18 | 92 | 60/60 | 8.0 |
| Example 16 | 200/18 | 1.4 | 80/80 | 7.1 |
| Example 17 | 200/18 | 20.3 | 160/160 | 9.1 |
| Comp. Ex. 18 | 200/18 | 90 | 40/20 | 7.2 |
| Comp. Ex. 19 | 200/18 | 89 | 0/0 | 5.3 |
| Example 21 | 200/18 | 94 | 100/100 | 9.2 |
| Example 22 | 200/18 | 93 | 200/200 | 9.0 |
| Example 23 | 200/18 | 93 | 120/160 | 8.7 |
| Example 24 | 200/18 | 93 | 60/40 | 5.6 |
| Example 25 | 200/18 | 94 | 80/60 | 5.9 |
| Example 26 | 200/18 | 92 | 60/40 | 5.3 |

As clearly appears from table 3, the addition of the amorphous polyester (B) to the amorphous isophthalic acid based polyester (A) results in powders which upon application and curing prove coatings with improved flexibility not only when slow deformations are considered but also when fast deformations, like direct or reverse impact, are applied. Comparative example 19 clearly shows that powders derived from one resin (PE 11) having an identical monomer composition as the physical blend of Example 3 does not prove any flexibility at all.

Besides, it has been observed that the addition of the amorphous polyester (B) to the amorphous isophthalic acid rich polyester (A) permits to obtain good weathering properties. In table 4, the relative 60° gloss values, recorded every 400 hours, according to ASTM D523, is reported for the coating obtained from example 14 and 15, submitted to the Q-UV accelerated weathering test. In this table only gloss reductions until 50% of the maximum value are mentioned. Weathering measurements are conducted in a very severe environment, i.e. the Q-UV accelerated weathering tester (Q-Panel Co) according to ASTM G53-88 (standard practice for operating light and water exposure apparatus—fluorescent UV/condensation type—for exposure of non metallic materials). For this table, coated panels have been subjected to the intermittent effects of condensation (4 hours at 50° C.) as well as the damaging effects of sunlight simulated by fluorescent UV-A lamps (340 nm, I=0.77 W/m²/nm) (8 hours at 60° C.).

The panels used in the Q-UV are chromated aluminium ones.

In the same table are given the weathering results for the coating obtained from the powder of Comparative Example 20 (based on the composition of example 14 yet omitting the amorphous polyester (B) PE2) and Comparative Example 18 (which is similar to Example 14 but wherein the amorphous polyester (B) PE2 has been replaced by a semi-crystalline polyester PE 10), all formulated according to the brown paint formulation as in formulation B. From table 3 one can learn that mediocre flexibility is obtained (Comparative example 18), yet as appears from table 4, the 20 parts-addition of semi-crystalline polyester PE10 to the isophthalic acid rich polyester PE1 has a very negative influence on its weathering performances.

Low gloss thermosetting powder coating compositions often are not resistant to burnish. Namely, an article having low gloss will change to a high gloss after marring, scratching or rubbing. Surprisingly it also has been observed that low gloss coatings, obtained from a composition accordingly to the invention prove an outstanding burnish resistance contrary to coatings derived from a similar binder but not comprising the amorphous polyester (B).

TABLE 4

| | UV-A (340 nm), I = 0.77 W/m²/nm | | | |
|---|---|---|---|---|
| Hours | Example 14 | Example 15 | Comparative Example 20 | Comparative Example 18 |
| 0 | 100 | 100 | 100 | 100 |
| 400 | 100 | 99 | 100 | 99 |
| 800 | 99 | 99 | 100 | 98 |
| 1200 | 98 | 98 | 100 | 98 |
| 1600 | 99 | 100 | 100 | 93 |
| 2000 | 97 | 99 | 100 | 81 |
| 2400 | 99 | 97 | 99 | 68 |
| 2800 | 98 | 99 | 97 | 57 |
| 3200 | 97 | 98 | 96 | 39 |
| 3600 | 90 | 96 | 92 | |
| 4000 | 92 | 89 | 87 | |
| 4400 | 90 | 85 | 83 | |
| 4800 | 84 | 80 | 80 | |
| 5200 | 80 | 75 | 75 | |
| 5600 | 76 | 72 | 72 | |
| 6000 | 65 | 69 | 68 | |
| 6400 | 52 | 58 | 60 | |
| 6800 | 44 | 50 | 50 | |
| 7200 | 40 | 42 | 45 | |

As clearly appears from tables 3 and 4, powder compositions according to the present invention containing as a binder a combination of the carboxyl functional polyesters (A) and (B) according to the present invention prove upon application and curing a unique combination of properties such as a good flexibility and a remarkable weatherability.

EXAMPLES 27 TO 29

The powders obtained in Examples 21 to 26 were then used for the dry blending in a 1:1 weight ratio under intensive mixing. The performances of the resulting powder paints obtained after a curing cycle of 18 minutes at 200° C. are reproduced in Table 5

TABLE 5

| Blend of | Powder (i) 50 parts by weight | Powder (ii) 50 parts by weight | Gloss X | DI/RI Kg · cm XI | Erichsen mm XII |
|---|---|---|---|---|---|
| Example 27 | Example 22 | Example 24 | 29.4 | 100/100 | 8.9 |
| Example 28 | Example 21 | Example 25 | 50.7 | 100/120 | 9.0 |
| Example 29 | Example 23 | Example 26 | 40.7 | 80/80 | 8.3 |

As clearly appears from Table 5, dry blends of two powders each according to the present invention, allow to obtain flexible coatings with a variable gloss; the gloss reduction depending on the difference in the composition of the respective powder compositions.

EXAMPLE 30

The powder composition of Example 4 was applied using a GEMA-Volstatic PCG1 spray gun at a layer thickness of 150 μm on a 9 mm thick MDF panel placed in contact with a cupper support. The panel was cured in an SIR oven (comprising air cooled short wave twin tube emitters with gold reflector with a power output of 36 kW, about 100 kW/m$^2$) and heated at 150° C. in 30 seconds and then transferred and kept in a MIR oven (comprising air cooled medium wave fast response carbon arc emitters with gold reflector with a power output of 9 kW, about 33 kW/m$^2$) at 150° C. during 270 seconds. The coating obtained had a nice aspect and resisted to more than 100 double MEK-rubs.

EXAMPLE 31

Example 30 was repeated except that the substrate was first coated with a primer composition comprising 716 g of a carboxylated polyester based on terephthalic acid, isophthalic acid, adipic acid, neopentylglycol, ethylenglycol and trimethylolpropane and having an acid number of 30 mgKOH/g, 54 g of Araldite PT810, 150 g of Kronos 2160, 50 g of Blanc Fixe Micro, 30 g of Zn-stearate, 3 g of benzoin and 10 g of Modaflow 6000. This primer was applied at a coating thickness of 100 µm and cured in the MIR oven at 140° C. for 120 seconds. Subsequently the primer was sanded using a P240 sanding paper from 3M until a smooth surface was obtained. The composition of Example 4 was then applied on top of the sanded primer at a coating thickness of 80 µm and cured in a SIR oven at 150° C. for 30 seconds and then in a MIR oven at 150° C. for 270 seconds. The coating obtained had a smooth and nice appearance, resisting to more than 100 double MEK-rubs.

The invention claimed is:

1. A thermosetting powder composition containing a binder comprising:
    from 99 to 55 parts by weight, calculated on the total weight of polyesters, of at least one amorphous polyester (A) which comprises, with respect to the total amount of acids, from 50 to 100 mol % of isophthalic acid and optionally from 0 to 50 mol % of at least one other aliphatic, cycloaliphatic and/or aromatic polycarboxylic acid and, with respect to the total amount of alcohols, from 70 to 100 mol % of neopentyl glycol and optionally from 0 to 30 mol % of at least one other aliphatic and/or cycloaliphatic polyol, said amorphous polyester (A) having a number average molecular weight of from 1100 to 11500, and
    from 1 to 45 parts by weight, calculated on the total weight of polyesters, of at least one amorphous polyester (B) which comprises, with respect to the total amount of acids, from 75 to 100 mol % of at least one straight-chain saturated di-carboxylic aliphatic acid having from 4 to 14 carbon atoms and optionally from 0 to 25 mol % of at least one other aliphatic, cycloaliphatic and/or aromatic polycarboxylic acid and, with respect to the total amount of alcohols, from 75 to 100 mol % of at least one branched chain aliphatic diol and optionally from 0 to 25 mol % of at least one other aliphatic or cycloaliphatic polyol, said amorphous polyester (B) having a number average molecular weight of from 1100 to 17000.

2. The composition according to claim 1, wherein the polyester (A) is a carboxyl functional polyester having an acid number of from 10 to 100 mg of KOH/g and wherein the polyester (B) is a carboxyl functional polyester having an acid number of from 10 to 100 mg of KOH/g.

3. The composition according to claim 1, wherein the polyester (A) is an hydroxyl functional polyester having an hydroxyl number of from 10 to 100 mg of KOH/g and wherein the polyester (B) is an hydroxyl functional polyester having an hydroxyl number of from 10 to 100 mg of KOH/g.

4. The composition according to claim 1, wherein the polyester (A) comprises from 85 to 100 mole % of isophthalic acid with respect to the total amount of acids, and/or from 85 to 100 mole % of neopentyl glycol and from 0 to 15 mole % of tri- and/or tetrafunctional polyol, with respect to the total amount of alcohols.

5. The composition according to claim 1, wherein the straight chain saturated di-carboxylic aliphatic acid having from 4 to 14 carbon atoms in the amorphous polyester (B) is selected from the group consisting of succinic acid, adipic acid, glutaric acid, pimelic acid, suberic acid, azelaic acid, sebacic acid, dodecanedioic acid, undecanedioic acid, tridecanedioic acid, tetradecanedioic acid and the anhydrides thereof, or mixtures thereof.

6. The composition according to claim 1, wherein the branched chain aliphatic diol present in the amorphous polyester (B) is selected from the group consisting of propylene glycol, neopentyl glycol, 2-methyl-1,3-propanediol, 2-butyl-2-ethyl-1,3-propanediol, hydroxypivalate of neopentyl glycol and mixtures thereof.

7. The composition according to claim 1, wherein polyester (B) comprises, with respect to the total amount of acids, from 85 to 100 mole % of straight chain saturated di-carboxylic aliphatic acid having from 4 to 14 carbon atoms, and/or, with respect to the total amount of alcohols, from 85 to 100 mole % of branched chain aliphatic diol and from 0 to 15 mole % of tri- and/or tetrafunctional polyol.

8. The composition according to claim 1, wherein polyester (B) has a glass transition temperature of −100 to 25° C., measured by Differential Scanning calorimetry according to ASTM D3418 with a heating gradient of 20° C. per minute.

9. The composition according to claim 1, wherein the binder comprises one or more crosslinking agents having functional groups capable of reacting with the functional groups of polyesters (A) and (B).

10. The composition according to claim 2, wherein the binder comprises one or more crosslinking agents selected from the group consisting of polyepoxy compounds containing at least two epoxy groups per molecule, acrylic copolymers containing glycidyl groups, β-hydroxyalkylamides or any combination thereof.

11. The composition according to claim 10, wherein the crosslinking agent is used in an amount of from 0.25 to 1.4 equivalent of carboxylic groups existing in the amorphous polyester (A) and the amorphous polyester (B) per equivalent of epoxy and/or β-hydroxyalkyl groups.

12. A composition comprising from 35 to 95 weight % of amorphous polyester (A) according to claim 1, from 1 to 25 wt % of amorphous polyester (B) according to claim 1, from 2 to 30 wt % of crosslinking agent having functional groups being reactive with the functional groups of the amorphous polyesters, from 0 to 5 wt % of crosslinking catalyst, from 0 to 5 wt % of usual additives and from 0 to 40 wt % of dyes and/or pigments.

13. A composition comprising a blend of at least one powder composition (i) comprising at least one polyester (A) and at least one polyester (B) according to claim 1, and at least one powder composition (ii) comprising at least one amorphous polyester (A') different from the polyester (A) and which comprises, with respect to the total amount of acids, from 50 to 100 mol % of isophthalic acid and optionally from 0 to 50 mol % of at least one other aliphatic, cycloaliphatic and/or aromatic polycarboxylic acid and, with respect to the total amount of alcohols, from 70 to 100 mol % of neopentyl glycol and optionally from 0 to 30 mol % of at least one other aliphatic and/or cycloaliphatic polyol, said polyester amorphous (A') having a number average molecular weight of from 1100 to 11500.

14. The composition according to claim 13, wherein the powder composition (ii) further comprises at least one amorphous polyester (B') which may be the same or different from the polyester (B) and which comprises, with respect to the total amount of acids, from 75 to 100 mol % of at least one straight-chain saturated di-carboxylic aliphatic acid having from 4 to 14 carbon atoms and optionally from 0 to 25 mol % of at least one other aliphatic, cycloaliphatic and/or aromatic polycarboxylic acid and, with respect to the total amount of alcohols, from 75 to 100 mol % of at least one branched chain aliphatic diol and optionally from 0 to 25 mol % of at least one other aliphatic or cycloaliphatic polyol, said amorphous polyester (B') having a number average molecular weight of from 1100 to 17000.

15. A process for coating an article, comprising applying the composition according to claim 1 to an article by spray deposition using an electrostatic or triboelectric gun or by fluidized-bed deposition, and then subjecting the article to a curing operation at a temperature of from 100 to 300° C. for a time of from 5 seconds to 60 minutes.

16. Article partially or entirely coated by the process of claim 15.

* * * * *